(12) United States Patent
Naito (10) Patent No.: US 7,147,240 B2
(45) Date of Patent: Dec. 12, 2006

(54) SELF-PROPELLED PLATFORM FOR WATERCRAFT

(76) Inventor: Koichiro Naito, 1246-39 Ooaza Nishikiwa, Ube, Yamaguchi, 755-0151 (JP)

( * ) Notice: Subject to any disclaimer, the term of this patent is extended or adjusted under 35 U.S.C. 154(b) by 0 days.

(21) Appl. No.: 10/541,760

(22) PCT Filed: Jan. 15, 2004

(86) PCT No.: PCT/JP2004/000260

§ 371 (c)(1),
(2), (4) Date: Jul. 7, 2005

(87) PCT Pub. No.: WO2004/063002

PCT Pub. Date: Jul. 29, 2004

(65) Prior Publication Data

US 2006/0175798 A1    Aug. 10, 2006

(30) Foreign Application Priority Data

Jan. 16, 2003    (JP)    ............ 2003-008515

(51) Int. Cl.
*B60P 1/00*    (2006.01)
(52) U.S. Cl. .................. 280/414.1; 114/344
(58) Field of Classification Search ............ 280/414.1, 280/414.3; 180/14.2; 114/344
See application file for complete search history.

(56) References Cited

U.S. PATENT DOCUMENTS

| | | | | |
|---|---|---|---|---|
| 4,712,636 A | * | 12/1987 | Ishimatsu | ........... 180/198 |
| 4,915,577 A | * | 4/1990 | Fraser | ........... 414/476 |
| 6,341,793 B1 | * | 1/2002 | Braun | ........... 280/414.1 |
| 6,869,094 B1 | * | 3/2005 | Fogg | ........... 280/414.3 |

FOREIGN PATENT DOCUMENTS

| | | |
|---|---|---|
| JP | 28-2534 | 3/1953 |
| JP | 51-49754 | 11/1976 |
| JP | 1983-102339 | 7/1983 |
| JP | 1986-61299 | 4/1986 |
| JP | 61-275036 | 12/1986 |
| JP | 1992-45198 | 4/1992 |

* cited by examiner

Primary Examiner—Tony Winner
(74) Attorney, Agent, or Firm—Muramatsu & Associates (57) ABSTRACT

A self-propelled platform for a small watercraft. The platform is used to carry a small watercraft from a storage place on the land to sea, and when the watercraft is in use, the platform enables the watercraft to be moored and stored on sea. The platform also enables preparation work for the use of the watercraft to be performed easily and safely by only one person. The platform has a body portion (2) for removably receives a watercraft body, wheel portions (4a, 4b) arranged below the body portion (2), power portions (5a, 5b) for driving the wheel portions (4a, 4b), power transmission portions (6a, 6b) for connecting the power portions (5a, 5b) and the wheel portions (4a, 4b), a control portion (11) for controlling the drive of the wheel portions (4a, 4b), and floating body portions (7a, 7b) installed to the body portion (2).

8 Claims, 8 Drawing Sheets

SELF-PROPELLED PLATFORM FOR WATERCRAFT

TECHNICAL FIELD

The present invention relates to self-propelled platforms, and more particularly, to a self-propelled platform that carries a small watercraft from land onto the sea and that can be moored on the sea.

BACKGROUND ART

In general, leisure watercrafts, such as motorboats, are stored on the sea inside marinas, or in boat yards or boathouses on land when they are not used. In order to use watercrafts stored on the sea, there is no need to carry the watercrafts to the sea, and users simply get on and pilot the watercrafts. This is simple and easy. However, the rent for mooring is high, and care is necessary, for example, when high waves are caused by a typhoon. In contrast, when a watercraft is stored on land, it is carried onto the sea with much labor and manpower because, in many cases, a boat yard is located away from the shore, or watercrafts are stacked in a boathouse even when the boathouse is near the shore. Heavy equipment, such as a crane, is sometimes needed, and the carrying operation is troublesome. Accordingly, apparatuses that easily carry a small watercraft stored on land have been proposed.

For example, Japanese Unexamined Patent Application Publication No. 5-193559 (hereinafter referred to as Patent Document 1) discloses "a self-propelled platform including a driver and a carriage connected to the driver, wherein the driver includes wheels, a driving means for driving the wheels, and a steering wheel, and the carriage includes wheels, a main body, mounts provided on the main body, and a positioning means for positioning a watercraft at a desired longitudinal position on the mounts".

In the invention disclosed in Patent Document 1, a small watercraft is loaded on the self-propelled platform, is carried from a storage place to the waterside, and is launched on the water by putting the platform into the water. Conversely, when the small watercraft is carried to the shore, it is transferred onto the platform by putting the platform into the water, and is moved to a predetermined storage place. The small watercraft can be easily hoisted on land and launched on the water. Since the driving means is not provided in the carriage, but is provided in the driver, it does not become wet even when the carriage enters the water, and therefore, does not easily deteriorate.

Japanese Unexamined Patent Application Publication No. 10-181683 (hereinafter referred to as Patent Document 2) discloses "a small-watercraft platform wherein a carriage is provided below a receiver for supporting the bottom of a small watercraft, a rear portion of the receiver is pivotally mounted on the carriage, and a receiver-tilting device is provided near a pivot shaft to tilt and hold the receiver at a predetermined tilting angle".

In the invention disclosed in Patent Document 2, after the bottom of a small watercraft is widely supported by the tiltable receiver in the water, the small watercraft and the small-watercraft platform are hoisted simultaneously. Therefore, the hoisting operation is safely performed with little influence of wind and waves, and the operation is easy and reliable.

As an apparatus for moving a watercraft up and down on the sea, Japanese Unexamined Patent Application Publication No. 8-216981 (hereinafter referred to as Patent Document 3) discloses "a floating platform including a loading base on which a watercraft is placed, and a pair of tubular floats arranged on both widthwise sides of the loading base, wherein each of the floats is partitioned into front and back airtight chambers, an air supply and exhaust tube and a water supply and exhaust tube are respectively connected to the airtight chambers, and the front and back air tight chambers are nonuniformly divided in the front-back direction".

In the invention disclosed in Patent Document 3, the tilt of the floating platform in the front-back direction caused by adjusting the buoyancy of the floats in the front-back direction acts as a force that reduces or absorbs the tilt of the floating platform in the right-left direction. Therefore, it is possible to reliably prevent the floating platform from tilting in the right-left direction or turning over when being moved up and down. Even when the floating platform does not turn over, it can be effectively prevented from tilting in the right-left direction, and therefore, a passenger will not panic.

In the conventional arts described in Patent Document 1 and Patent Document 2, certainly, launching and hoisting operations can be easily and safely performed when using a small watercraft, and the small watercraft can be easily carried through a path from a storage space onto the sea and through a reverse path. However, it is basically impossible for one person to perform these operations, and several persons are necessary. Furthermore, since the persons need to get off the watercraft during hoisting, they may soil their feet or may slip at that time. Moreover, at a moment when the watercraft is unloaded from the platform onto the sea or a moment when the watercraft is loaded from the sea onto the platform, it is synchronized with the waves on the sea, while the platform stays at the bottom of the sea. Therefore, it is difficult to load the watercraft on the platform particularly during hoisting.

In contrast, the conventional art described in Patent Document 3 provides the floating platform that prevents the bottom of the watercraft from being soiled with, for example, shells and algae when the watercraft is moored on the sea for a long time. While the floating platform can be moored in a predetermined place such as a marina or a harbor, the watercraft cannot be hoisted therefrom so as to be stored on land, and the floating platform cannot be moored for a long time at an appropriate place on the sea during use of the watercraft.

The present invention has been made to meet such conventional circumstances, and an object of the invention is to provide a self-propelled platform that carries a small watercraft from a storage place on land onto the sea, that can be moored and stored on the sea during use of the small watercraft, and that enables one person to easily, sanitarily, and safely make preparations for use of the small watercraft.

DISCLOSURE OF INVENTION

A self-propelled platform according to an invention claimed in claim 1 includes a body portion that removably receives a watercraft body, wheel portions provided below the body portion, power portions for driving the wheel portions, power transmission portions for connecting the power portions and the wheel portions, a control portion for controlling the driving of the wheel portions, and floating body portions provided in the body portion.

The self-propelled platform having these features runs by itself on land under the control of the wheel portions, the power portions, the power transmission portions, and the control portion, and is floated on the sea by the floating body portions in a state in which a watercraft body is removably loaded thereon. This allows one person to easily and safely carry, unload, load, and hoist the watercraft on land and sea. Moreover, the self-propelled platform does not need to be stored in a marina or near a wharf in a harbor when the watercraft is stored in a non-use state or sails. Therefore, these places can be effectively used with reduced congestion.

A self-propelled platform according to an invention claimed in claim 2 includes a body portion that removably receives a watercraft body, wheel portions provided below the body portion, power portions provided above the wheel portions to drive the wheel portions, power transmission portions for connecting the power portions and the wheel portions, a control portion for controlling the driving of the wheel portions, and floating body portions provided in the body portion, above the wheel portions, and below the power portions.

In the self-propelled platform having the above features, since the floating body portions are provided below the power portions on the sea, the power portions do not sink in the sea. Therefore, trouble is reduced and maintenance is easy, in addition to the operations and advantages of the invention of claim 1. This ensures higher reliability and greater safety.

In a self-propelled platform claimed in claim 3, according to the self-propelled platform claimed in claim 1 or 2, the body portion includes a mooring means.

In addition to the operations and advantages of the invention claimed in claim 1 or 2, the self-propelled platform of this invention provides operations and advantages, that is, the self-propelled platform can be safely moored and stored for a long time on the sea by the mooring means, and the watercraft can be properly and safely loaded on the self-propelled platform from the leeward side.

In a self-propelled platform claimed in claim 4, according to the self-propelled platform claimed in claim 1 or 2, the body portion includes a mooring means and a buoy.

In addition to the operations and advantages of the invention claimed in claim 1 or 2, the self-propelled platform of this invention provides an operation, that is, the buoy functions as a mark when the watercraft is loaded on the self-propelled platform after the platform is moored on the sea. Therefore, the self-propelled platform moored on the sea can be easily found and identified by the buoy. Similarly to the self-propelled platform claimed in claim 3, the watercraft can be properly and safely loaded on the self-propelled platform from the leeward side.

Finally, in a self-propelled platform claimed in claim 5, according to the self-propelled platform claimed in claim 1 or 2, the floating body portions are movable between the wheel portions and the power portions.

In addition to the operations and advantages of the invention claimed in claim 1 or 2, the self-propelled platform of this invention provides an operation, that is, the degree of float and sink of the self-propelled platform is adjusted depending on the draft of the watercraft to be loaded thereon. Since the relative positions of the loaded watercraft and the self-propelled platform can be adjusted, the watercraft can be easily loaded and unloaded on the sea, and can more stably run on the sea.

BEST MODE FOR CARRYING OUT THE INVENTION

A self-propelled platform according to an embodiment of the present invention will be described below with reference to FIGS. 1 to 8.

Figure 1:
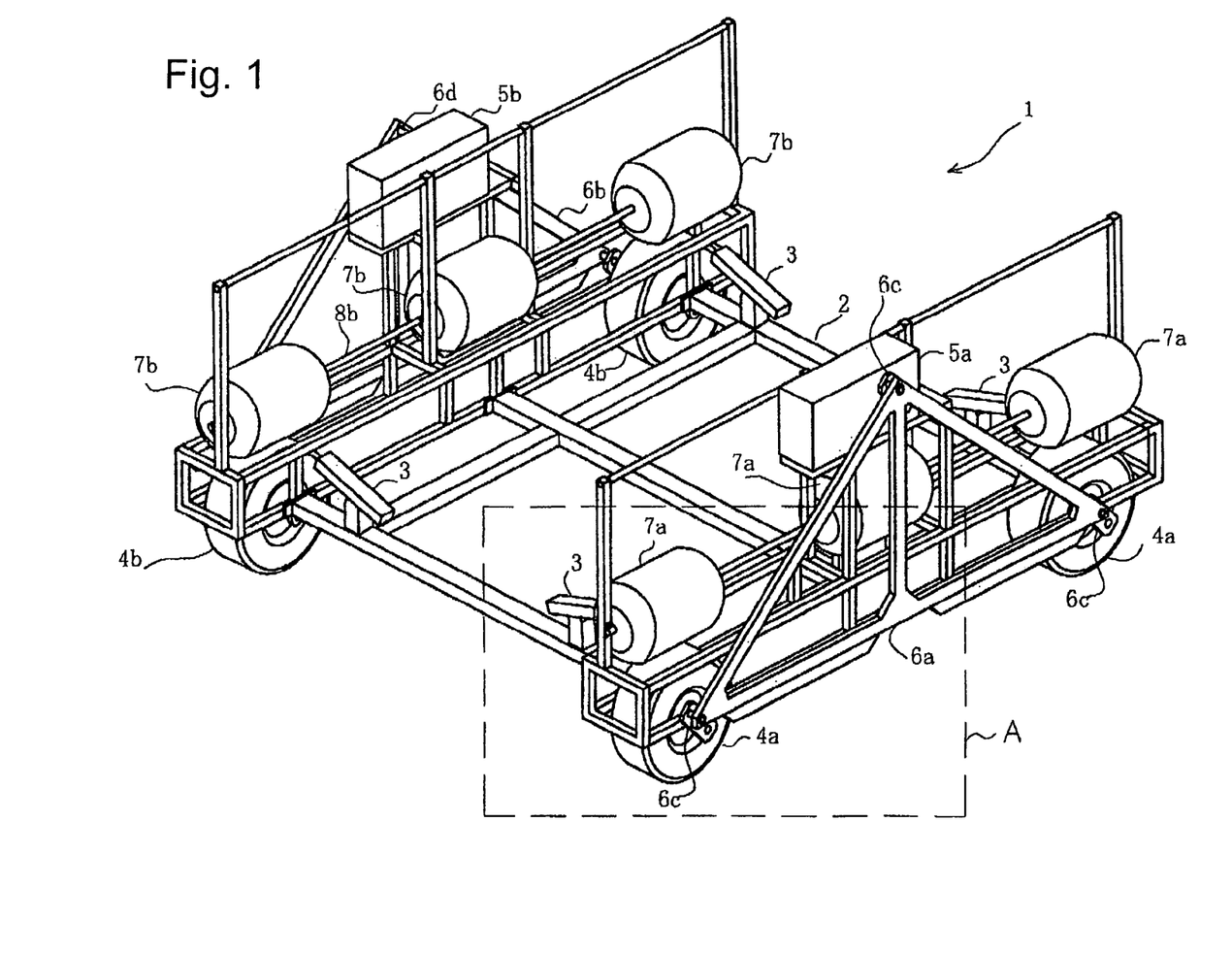
FIG. 1 is an outside view of a self-propelled platform according to an embodiment of the present invention.

FIG. 1 is an outside view of a self-propelled platform according to this embodiment.

Referring to FIG. 1, a self-propelled platform 1 of this embodiment includes a main frame 2 that is provided with four mounts 3 for supporting the bottom of a watercraft, and two pairs of wheels 4a and 4b are longitudinally arranged under the main frame 2. Motors 5a and 5b are respectively connected to the two pairs of wheels 4a and 4b via triangular connecting bars 6a and 6b and cranks 6c and 6d. Floats 7a and 7b connected to float shafts 8a and 8b are provided between the motors 5a and 5b and the two pairs of wheels 4a and 4b.

In this embodiment, the self-propelled platform 1 can run on land with the body of a watercraft placed on the mounts 3 by transmitting power to the cranks 6c and 6d by the rotation of the motors 5a and 5b, and turning the entire triangular connecting bars 6a and 6b with the rotation of the cranks 6c and 6d to operate the wheels 4a and 4b. The self-propelled platform 1 can also float on the sea because of the buoyancy of the floats 7a and 7b.

An electric system concerning the driving of the self-propelled platform of this embodiment will now be described with reference to FIG. 2.

Figure 2:
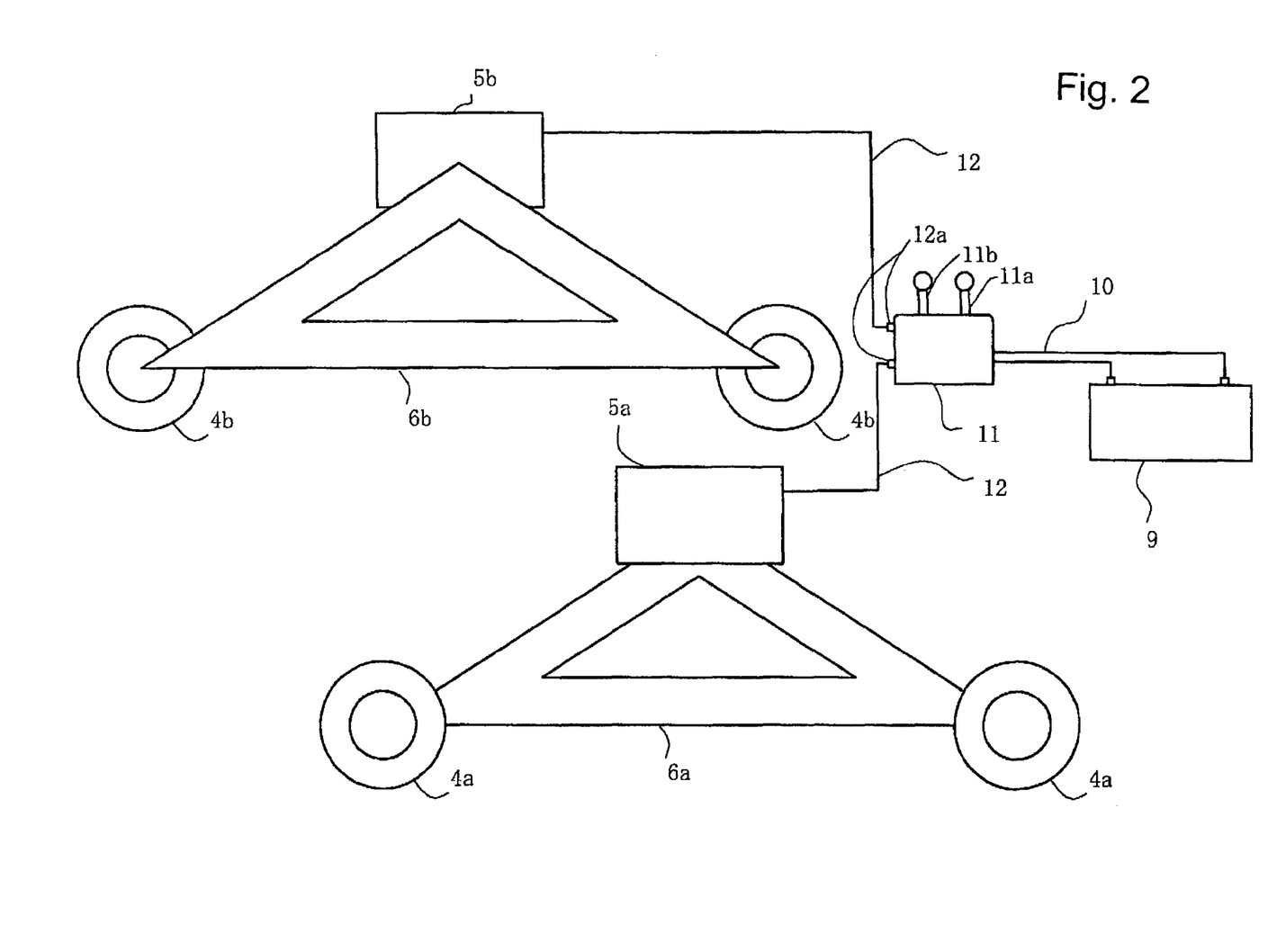
FIG. 2 is a conceptual view of an electric system for driving the self-propelled platform of this embodiment.

FIG. 2 is a conceptual diagram of an electric system for driving the self-propelled platform of this embodiment.

Referring to FIG. 2, the motors 5a and 5b are connected to a control box 11 by motor-driving cables 12 via connectors 12a, and the control box 11 is connected to a battery 9 by a power supply cable 10. The motors 5a and 5b are operated by power supplied from the battery 9, and the power supplied via the motor-driving cables 12 is controlled by the control box 11.

The supply of power is controlled with levers 11a and 11b provided in the control box 11.

While the battery 9 and the control box 11 are installed inside a watercraft to be loaded, they may be fixed or may be portable. The battery 9 can be charged by a power generator provided in the watercraft. When the watercraft does not have a power generator, preferably, the battery 9 is charged by another charging device. For example, the battery 9 may be a DC battery with a rated voltage of 24 V.

When the battery 9 and the control box 11 are installed inside the watercraft, or even when they are portable, it is quite convenient to provide the control box 11 with the connectors 12*a*, because the motor-driving cables 12 can be detached from the connectors 12*a* when the watercraft is unloaded.

In the electric system having this configuration, an operator gives instructions, for example, for start and stop, by using the levers 11*a* and 11*b* of the control box 11. The left and right motors 5*a* and 5*b* can be independently driven by the levers 11*a* and 11*b*. By the rotation of the motors 5*a* and 5*b*, the connecting bars 6*a* and 6*b* are turned via the cranks 6*c* and 6*d* shown in FIG. 1, the wheels 4*a*, 4*a*, 4*b*, and 4*b* are thereby operated, and the self-propelled platform 1 starts to run. Since the motors 5*a* and 5*b* can be independently rotated, for example, only the left motor 5*a* is rotated by using the lever 11*a* in order to turn the self-propelled platform 1 to the right. Of course, the self-propelled platform 1 can be reversed.

Since the self-propelled platform 1 runs by itself in this way, basically, one person can carry the watercraft to a desired place on land. While the self-propelled platform 1 is operated by a person aboard the watercraft, it can also be operated outside the watercraft or the self-propelled platform 1. The self-propelled platform 1 can be operated by human power without using electric power.

Operation of the self-propelled platform of this embodiment on the sea will be described with reference to FIGS. 3 and 4.

Figure 3:
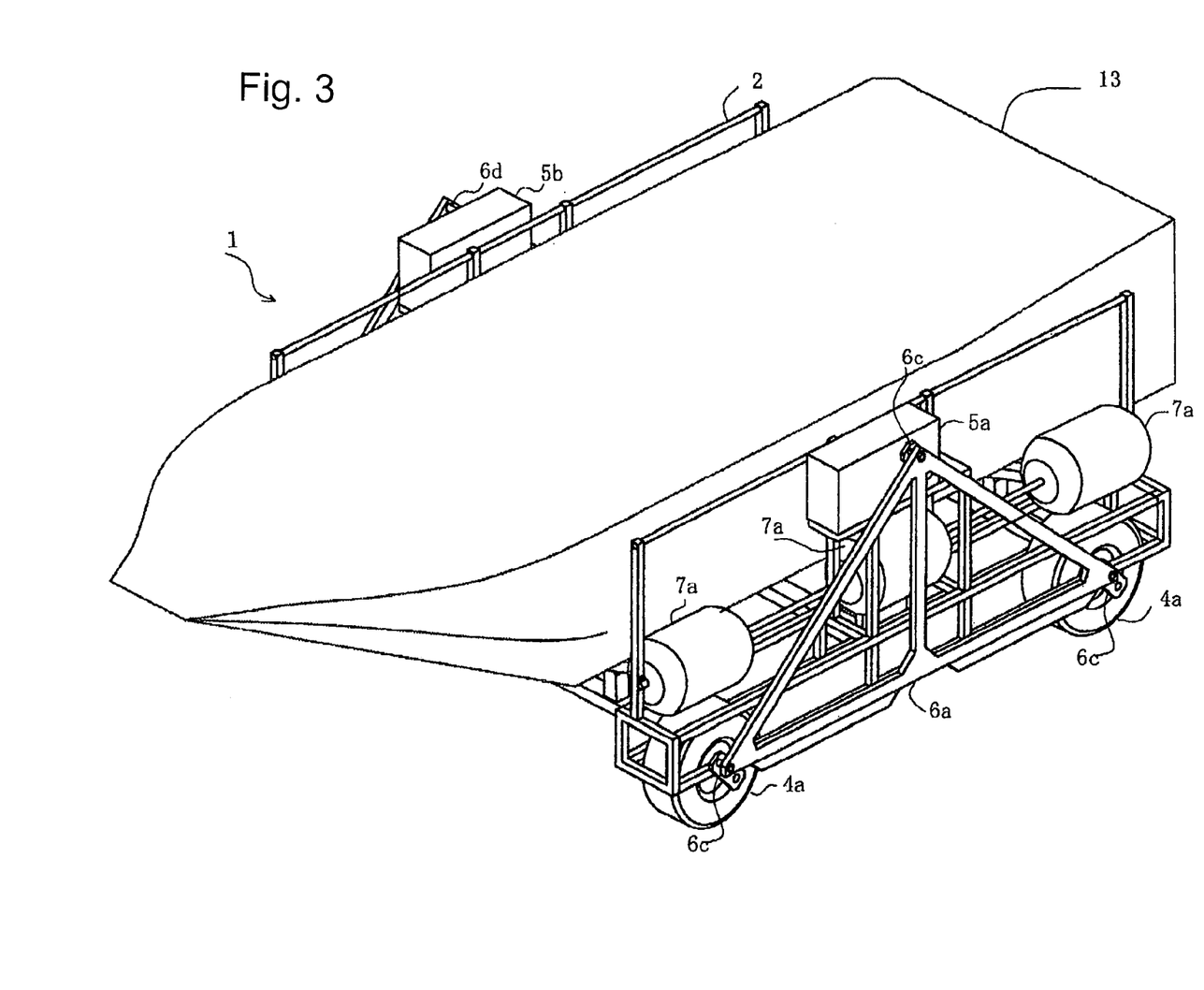
FIG. 3 is an outside view showing a state in which a watercraft is loaded on the self-propelled platform of this embodiment.

FIG. 3 is an outside view showing a state in which a watercraft is loaded on the self-propelled platform of this embodiment.

In FIG. 3, the same structures as those shown in FIG. 1 are denoted by the same reference numerals, and descriptions thereof are omitted.

In order to carry a watercraft 13 onto the sea, the watercraft 13 is placed on the self-propelled platform 1, as shown in FIG. 3, and is carried to the shore by causing the self-propelled platform 1 to run. When the self-propelled platform 1 reaches the shore, it enters the sea. When the depth of water gradually increases, the watercraft 13 floats because of its buoyancy, and the self-propelled platform 1 can also float because of the buoyancy of the floats 7*a* and 7*b*.

The floats 7*a* and 7*b* are made of styrene foam. By coating outer surfaces of the floats 7*a* and 7*b* with, for example, urethane resin, the corrosion resistance is increased, and the floats 7*a* and 7*b* can withstand long use. The floats 7*a* and 7*b* may be wrapped in, for example, a vinyl sheet, instead of being coated with resin. The material of the floats 7*a* and 7*b* is not limited to styrene foam, and may be any material, such as another synthetic resin or wood, which gives buoyancy, for example, a material containing air therein. While three floats 7*a* and three floats 7*b* are respectively provided on the right and left sides in this embodiment, the number and shape of the floats are not limited as long as the self-propelled platform 1 can have a proper buoyancy on the sea.

The motors 5*a* and 5*b* are provided above the floats 7*a* and 7*b*, and are always placed above the surface of the sea. Since the motors 5*a* and 5*b* do not sink in the sea water, they are safe, are not prone to mechanical trouble, and can withstand long use. The motors 5*a* and 5*b* may be made watertight, and may be arranged regardless of the positions of the floats 7*a* and 7*b*. Needless to say, for example, the motors 5*a* and 5*b* may be used in the water while being directly connected to the wheels 4*a*, 4*a*, 4*b*, and 4*b*.

Since the self-propelled platform 1 is used on the sea, it is preferably subjected to, for example, coating in order to increase the water resistance, corrosion resistance, and rust resistance.

Figure 4:
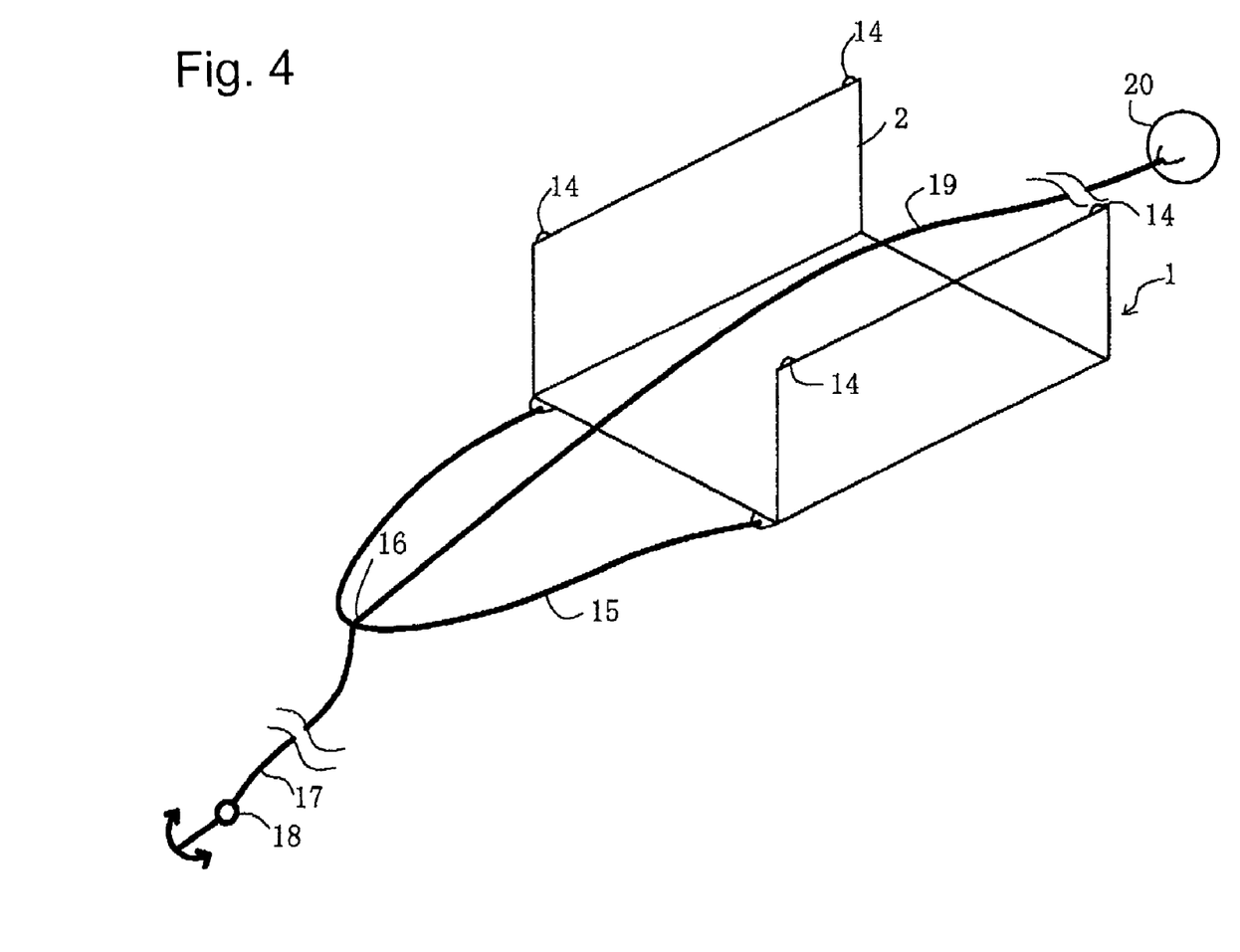
FIG. 4 is a conceptual view showing a method for fixing the watercraft to the self-propelled platform of this embodiment, and a mooring method on the sea.

FIG. 4 is a conceptual view showing a method for fixing a watercraft to the self-propelled platform of this embodiment, and a method for mooring the self-propelled platform on the sea.

Referring to FIG. 4, the main frame 2 of the self-propelled platform 1 is provided with two right hooks 14 and two left hooks 14 for watercraft fixing, and the self-propelled platform 1 and the watercraft 13 can be connected and fixed by passing a rope or the like through the watercraft-fixing hooks 14 and 14 from the watercraft 13. The number of the watercraft-fixing hooks 14 and 14 is not limited to four, and any number of hooks may be provided. A rope or the like may be directly tied from the watercraft 13 to the main frame 2 of the self-propelled platform 1 without providing the main frame 2 with the watercraft-fixing hooks 14.

A bow-fixing rope 15 is provided on a bow side of the self-propelled platform 1, and a bow-fixing jig 16 provided at almost the center of the bow-fixing rope 15 can be connected and fixed to a hook that is normally provided at the bow of the watercraft 13. Without using the bow-fixing jig 16, the bow-fixing rope 15 may be fixed by being directly passed through or connected to the hook of the watercraft 13.

When the self-propelled platform 1 with the watercraft 13 loaded thereon enters the sea, it stops driving by the motors 5*a* and 5*b*, and moves on the sea by the power of the watercraft 13. In a safe place where there is no obstacle, the watercraft 13 is separated from the self-propelled platform 1 by untying the rope for fixing the watercraft and the bow-fixing rope 15. This allows the watercraft 13 to move freely.

By dropping an anchor 18 connected to the bow-fixing rope 15 by an anchor rope 17 before the watercraft 13 is separated, the anchor 18 is fixed to the seabed, and therefore, the self-propelled platform 1 can be moored on the sea. While the bow-fixing rope 15 attached to the main frame 2 is conceptually included in the mooring means in this embodiment, for example, the anchor rope 17 may be directly provided on the main frame 2 so that the bow-fixing rope 15 is not included in the mooring means.

A buoy 20 connected to the bow-fixing rope 15 and the bow-fixing jig 16 via a buoy rope 19 is floated on the surface of the sea. Instead of connecting the buoy 20 via the bow-fixing rope 15 and the bow-fixing jig 16, the buoy rope 19 may be directly provided alone on the main frame 2. That is, while the buoy means conceptually includes the bow-fixing rope 15 and the bow-fixing jig 16 in this embodiment, it sometimes does not conceptually include the bow-fixing rope 15 and the bow-fixing jig 16, in a manner similar to that for the mooring means.

When the watercraft 13 finishes sailing, it moves to a place where the buoy 20 is floating on the sea, picks up the buoy 20, and draws the buoy rope 19, thereby hauling in the bow-fixing rope 15. The buoy rope 19 is connected to the bow-fixing rope 15 in order to more quickly pull up the bow-fixing rope 15. In addition, since the anchor 18 is also connected to the bow-fixing rope 15, it can be easily pulled up.

In this way, the buoy 20 enables the self-propelled platform 1, the bow-fixing rope 15, and the anchor 18 to be found easily. Moreover, when the buoy 20 is colored, is patterned, or is provided with a three-dimensional characteristic structure, distinction from other self-propelled platforms 1 is easy.

The buoy 20 may be provided with a transmitter or a light emitter, and a signal transmitted from the buoy 20 may be received or light emitted from the light emitter may be received inside the watercraft 13 so that finding and distinction can be easily performed, particularly in the night or in the fog. Alternatively, the buoy 20 may be provided with a receiver and a light emitter so as to emit light in response to a signal from the watercraft 13.

The self-propelled platform 1 is easily placed in the main frame 2, the watercraft 13 is fixed to the self-propelled platform 1 by using the watercraft-fixing hooks 14, the bow-fixing rope 15, and the bow-fixing jig 16, and the self-propelled platform 1 is moved again near the shore by the power of the watercraft 13. One person can safely and easily perform these operations while being aboard the watercraft 13.

When the depth of water becomes small, the action of buoyancy is lost, and the watercraft 13 is placed on the mounts 3 of the self-propelled platform 1. Therefore, the self-propelled platform 1 starts to run on land by its own power, and moves to, for example, a boat yard.

In this way, the self-propelled platform 1 of this embodiment utilizes the power of the motors 5a and 5b installed therein on land while the watercraft 13 is loaded thereon, and moves on the shore and the sea by utilizing the power of the watercraft 13, and the watercraft 13 can be separated therefrom. Furthermore, while the watercraft 13 is sailing, the self-propelled platform 1 is stored on the sea by mooring. After sailing, the self-propelled platform 1 can easily load the watercraft 13 again on the sea, and can return to the shore.

Basically, this operation can be safely and easily performed by one person. Therefore, launching and hoisting operations, which are conventionally troublesome, are made simple and easy, and this can reduce the burden on the user. Moreover, since the self-propelled platform 1 does not stay near the shore during storage and sailing of the watercraft 13, it is possible to effectively use congested marinas and surroundings of wharfs in harbors. This is remarkably advantageous.

Next, a position adjusting mechanism for the floats in the self-propelled platform of this embodiment will be described with reference to FIGS. 5 and 6.

Figure 5:
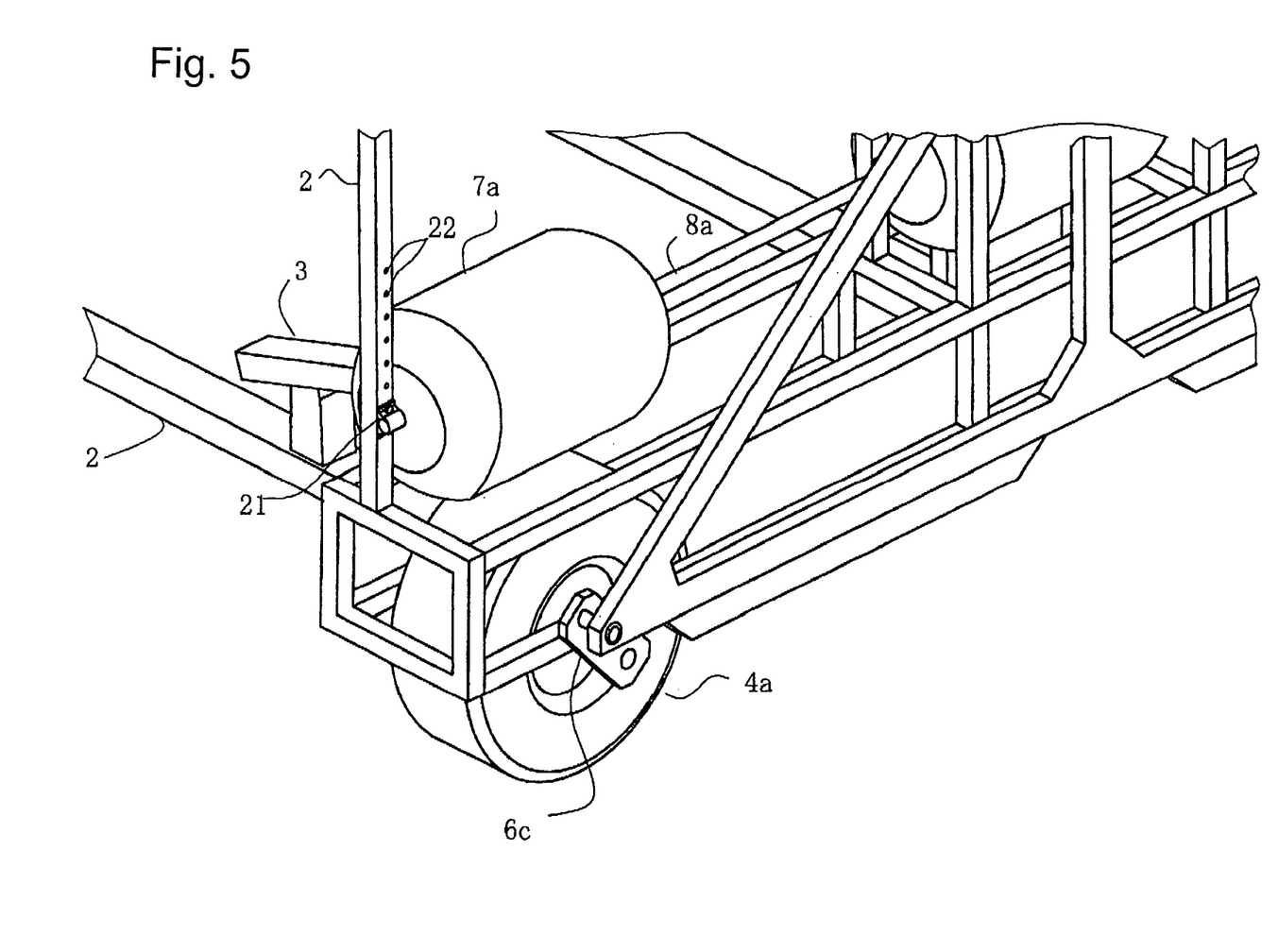
FIG. 5 is an enlarged view of an enclosed section A in FIG. 1.

FIG. 5 is an enlarged view of an enclosed section A in FIG. 1.

Referring to FIG. 5, the float shaft 8 on which the floats 7a are mounted is fixed to the main frame 2 by a fastener 21. The main frame 2 includes several fastener holes 22, and the positions of the floats 7a can be adjusted by fixing the float shaft 8a into another one of the fastener holes 22.

On the sea, the self-propelled platform 1 floats by the buoyancy of the floats 7a, and the watercraft 13 floats by its own buoyancy. Therefore, trouble sometimes occurs when the relative positions of the self-propelled platform 1 and the watercraft 13 are not balanced. For example, when the self-propelled platform 1 is too close to the watercraft 13, an upward force acts from the mounts 3 of the self-propelled platform 1 onto the watercraft 13, and it may be difficult to separate the watercraft 13. In contrast, when the self-propelled platform 1 is too far from the watercraft 13, the motors 5a and 5b may sink in the water, or the bottom of the self-propelled platform 1 may be damaged in the shallow sea.

Accordingly, it is necessary to adjust the position of the self-propelled platform 1 depending on the draft of the watercraft 13 to be loaded. That is, when a large part of the bottom of the watercraft sinks in the sea, the mounts 3 are placed at a low position by raising the floats 7a. Conversely, when a small part of the bottom of the watercraft sinks in the sea, the mounts 3 are placed at a high position by lowering the floats 7a. The space between the mounts 3 of the self-propelled platform 1 and the watercraft 13 can be thus adjusted. On the sea, when the space is not wide and the watercraft 13 is not in contact with the self-propelled platform 1, it can be easily unloaded from and loaded onto the self-propelled platform 1. Moreover, there is no fear that the bottom of the self-propelled platform 1 will be damaged and that the motors 5a and 5b will sink in the water.

A further description will be given of the relative positions of the self-propelled platform and the watercraft with reference to FIG. 6.

Figure 6:
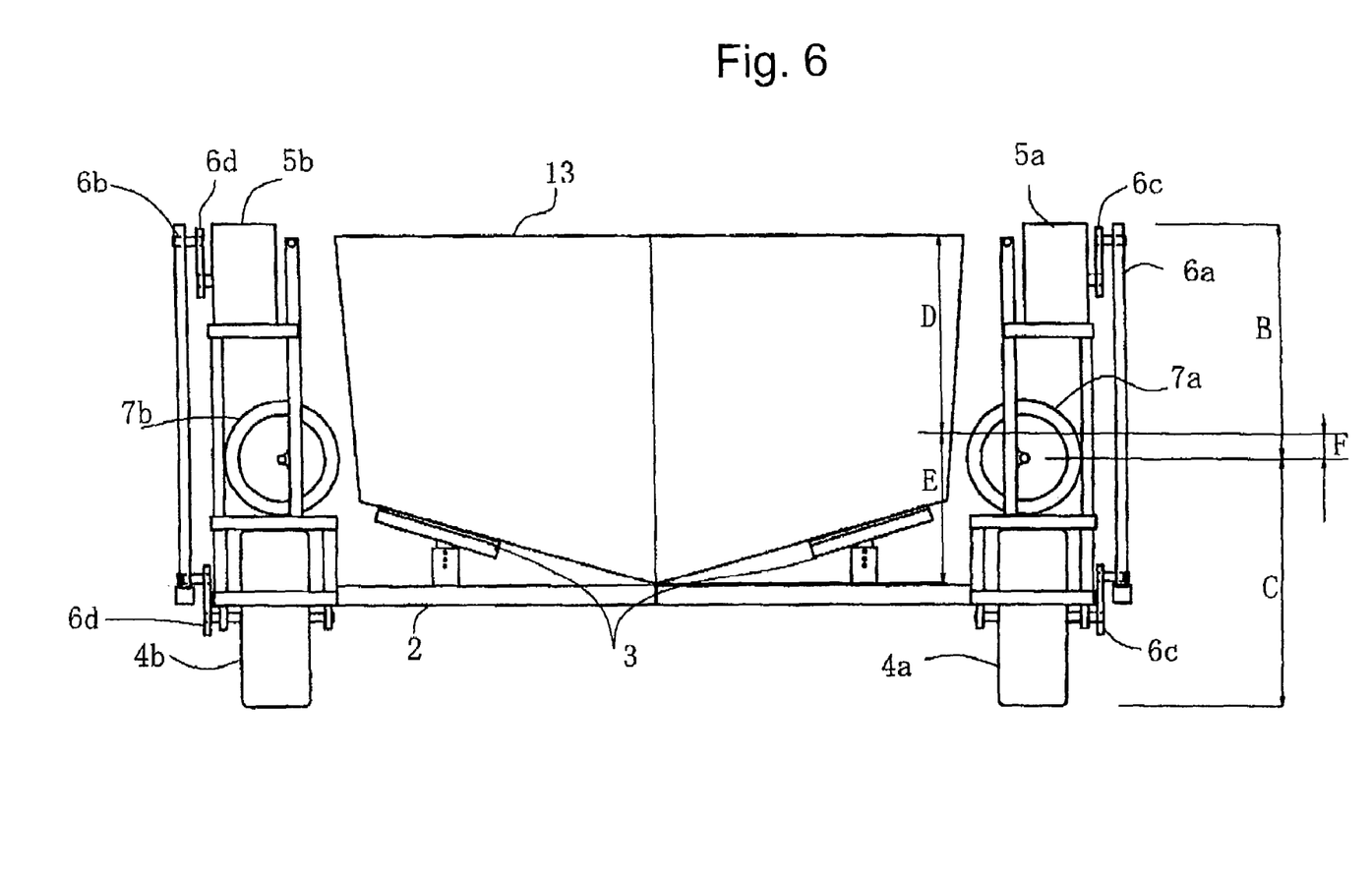
FIG. 6 is a front view showing a state in which the watercraft is loaded on the self-propelled platform of this embodiment.

FIG. 6 is a front view showing a state in which the watercraft is loaded on the self-propelled platform of this embodiment.

Referring to FIG. 6, when it is assumed that the self-propelled platform 1 with the watercraft 13 loaded thereon lies on the sea, a part B of the self-propelled platform 1 above the floats 7a and 7b protrudes from the surface of the sea, and a part C below the floats 7a and 7b sinks under the surface of the sea.

When it is assumed that a part D of the watercraft 13 protrudes from the surface of the sea and a part E sinks under the surface of the sea, although depending on the type and material of the watercraft 13, unbalance F is produced between the relative positions of the self-propelled platform 1 and the watercraft 13. Since the surface of the sea, of course, should remain unchanged in this state, the self-propelled platform 1 is placed deeper than in actuality because it is pushed by the weight of the watercraft 13, and the watercraft 13 is placed shallower than in actuality by the buoyancy received from the self-propelled platform 1. That is, the balance is adjusted at any point of the portion F.

In this embodiment, the positions of the floats 7a and 7b are changeable. More specifically, a plurality of fastener holes 22 are provided, as shown in FIG. 5, so that the float shafts 8a and 8b can be vertically moved and fixed. In the case shown in FIG. 6, the draft of the self-propelled platform 1 can be made substantially equal to the draft of the watercraft 13 by moving the floats 7a and 7b to the border between the sections D and E. Since the unbalance between the relative positions can be removed, safe and stable sailing on the sea is achieved, as described above. The relative position of the self-propelled platform 1 can be easily adjusted on the sea. Once the setting is made, it is rarely changed unless the number of persons aboard the watercraft 13 or the loadage is drastically changed. Therefore, it is preferable to make the setting before the self-propelled platform 1 is launched for the first use.

Since the relative position of the self-propelled platform 1 having this configuration can be adjusted depending on the draft of the watercraft to be loaded thereon, the self-propelled platform 1 is also applicable to watercrafts having various sizes and structures. With this adjustment of the relative position, the watercraft 13 can be safely and easily loaded and unloaded without touching the self-propelled platform 1 on the sea.

Finally, a description will be given of a method for using the self-propelled platform of this embodiment with reference to FIGS. 7 and 8.

Figure 7:
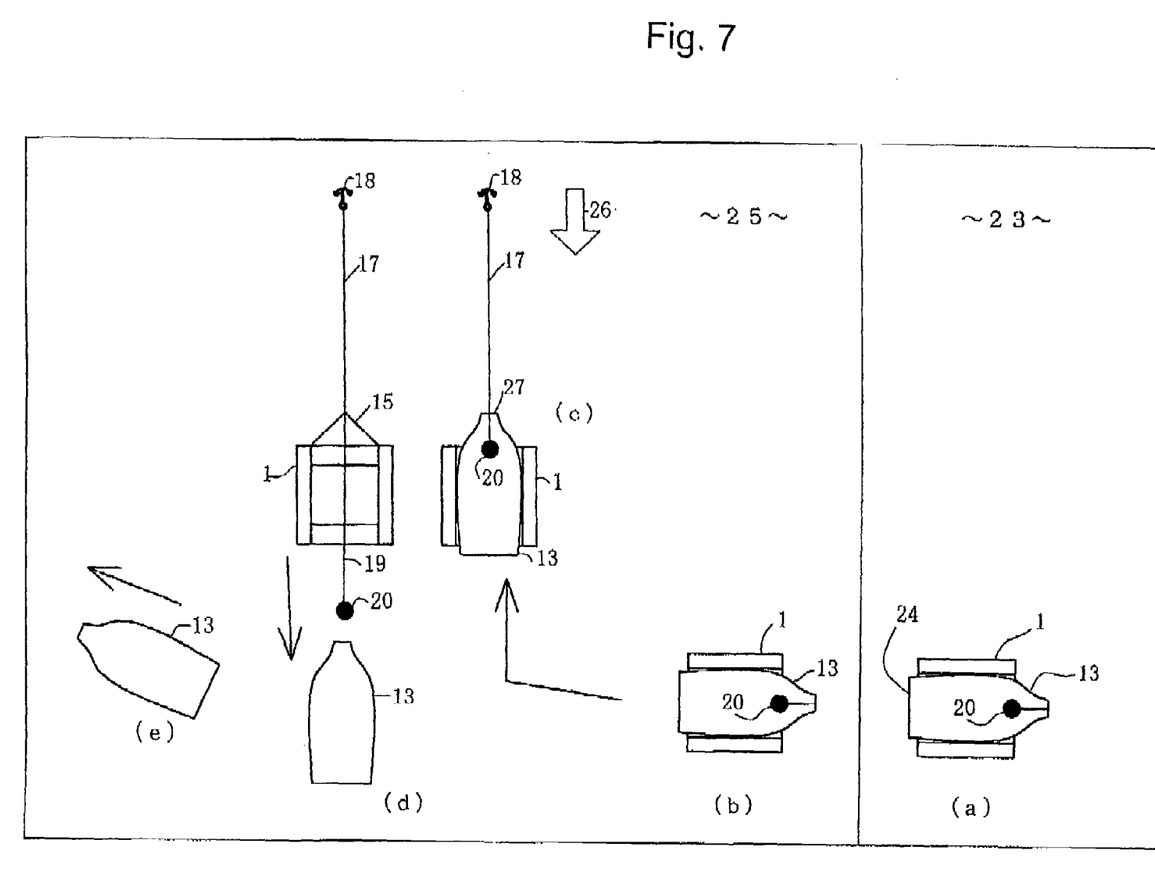
FIG. 7 is a conceptual view showing how to use the self-propelled platform of this embodiment.
Figure 8:
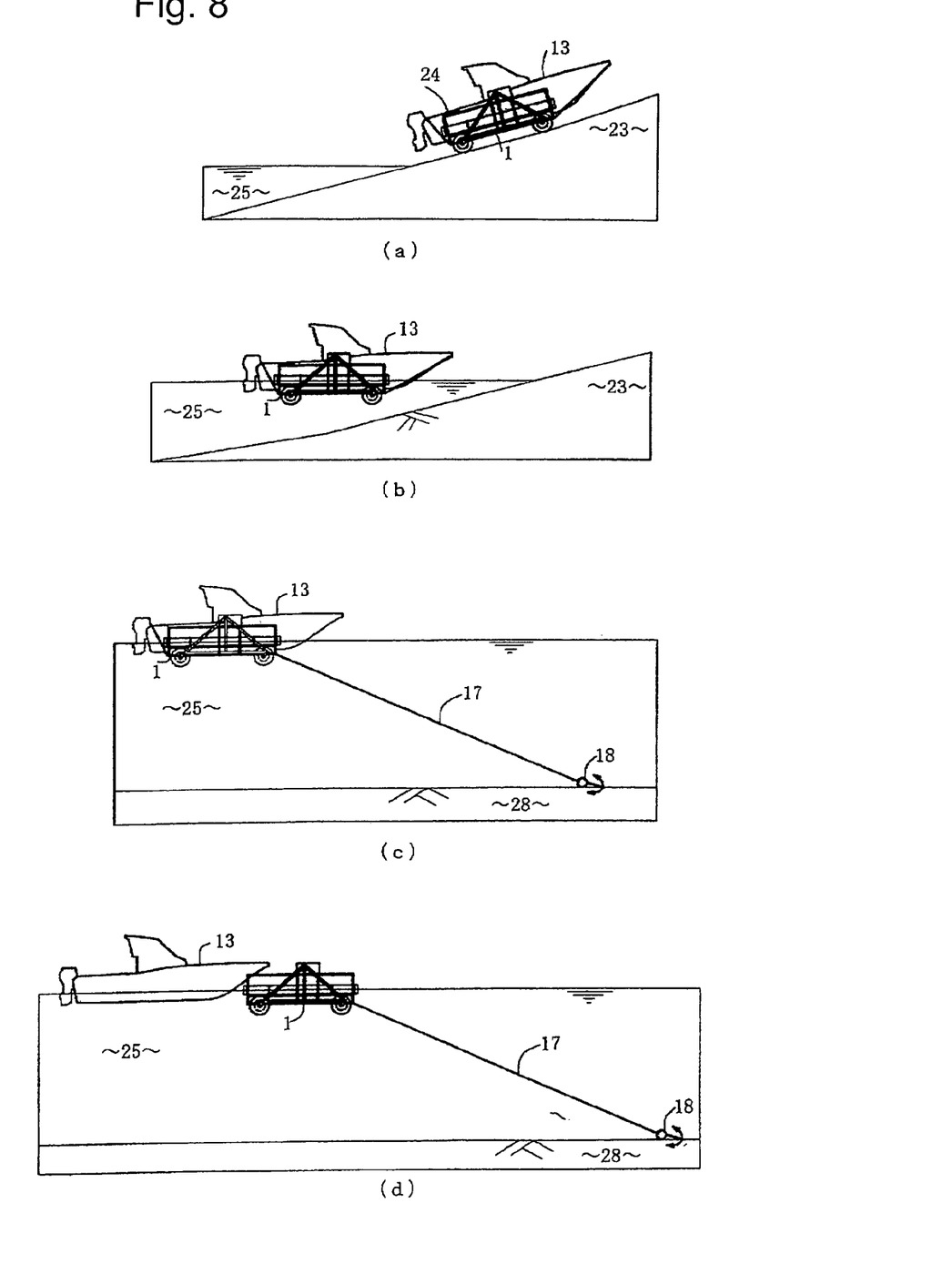
FIG. 8 is a conceptual view showing how to use the self-propelled platform of this embodiment.

FIGS. 7 and 8 are conceptual views showing a method of use of the self-propelled platform of this embodiment. FIGS. 7(a) to 7(d) respectively correspond to FIGS. 8(a) to 8(d) to show the method of use.

First, for sailing, the self-propelled platform 1 on which the watercraft 13 is loaded is carried from the boat yard to a shore 23, as shown in FIGS. 7(a) and 8(a). In this case, a person is aboard the watercraft 13, and causes the self-propelled platform 1 to run by operating the controller 11 while checking safety. On the shore 23, the orientation of the self-propelled platform 1 is adjusted so that a stern 24 points toward the sea 25.

Subsequently, the self-propelled platform 1 and the watercraft 13 are put into the sea 25, as shown in FIGS. 7(b) and 8(b). Since the self-propelled platform 1 and the watercraft 13 float by their own buoyancies when the depth of water increases, the self-propelled platform 1 is powered off, and the watercraft 13 is powered on. Then, the self-propelled platform 1 and the watercraft 13 move offshore by utilizing the power of the watercraft 13. While the self-propelled platform 1 and the watercraft 13 move offshore while being reversed in this embodiment, they may move offshore while advancing after its orientation is changed immediately after landing on the water.

The anchor 18 mounted in the self-propelled platform 1 is dropped at a proper offshore position, as shown in FIGS. 7(c) and 8(c). Since the anchor 18 is fixed to a sea bottom 28, the self-propelled platform 1 can be moored on the sea.

Anchoring allows a bow 27 of the self-propelled platform 1 to constantly point against a wind 26, and therefore, loading of the watercraft 13 on the self-propelled platform 1 can be properly and safely performed. It is necessary not only to ensure safety of swimmers and fishermen by running outside, for example, fishing places and swimming areas, and but also to perform anchoring at a place that ensures a sufficient safety of other watercrafts.

Subsequently, the bow-fixing rope 15 for fixing the self-propelled platform 1 and the watercraft 13, and other fixing ropes are untied, and the watercraft 13 is reversed to separate from the self-propelled platform 1, as shown in FIGS. 7(d) and 8(d). Although not shown in FIG. 8(d), the buoy 20 is cast down from the watercraft 13, as shown in FIG. 7(d).

The buoy 20 is not provided only to allow the self-propelled platform 1 moored on the sea to be easily found, as described above. Since the buoy 20 is driven by the wind, it always lies leeward, and the watercraft approaches the self-propelled platform 1 from the leeward side when returning. Therefore, in addition to the above-described anchoring effect, the watercraft 13 can be properly and safely loaded on the self-propelled platform 1 from the leeward side by picking up and hauling at the buoy 20.

Finally, the watercraft 13 can sail while the self-propelled platform 1 is left on the sea, as shown in FIG. 7(e).

When the watercraft 13 returns after sailing, the buoy 20 is picked up, the buoy rope 19 and the bow-fixing rope 15 are hauled at, and the watercraft 13 is loaded on and fixed to the self-propelled platform 1, as described above. After the anchor is raised, the self-propelled platform 1 and the watercraft 13 move by the power of the watercraft 13. When the buoyancy is lost in the shallows, the watercraft 13 is placed on the self-propelled platform 1, and therefore, the self-propelled platform 1 is powered on, and is moved on land to the boat yard.

In this embodiment having such a configuration, one person aboard the watercraft can safely and easily perform the running operation on land, the running operation on the sea, and the loading and unloading operations of the watercraft on and from the self-propelled platform. Therefore, it is possible to reduce much manpower and labor conventionally needed for launching and hoisting.

Since running can be possible on both land and sea, mooring on the sea is achieved. Consequently, the self-propelled platform and the watercraft can be stored in a boat yard away from a marina or the like on land, and the self-propelled platform can be stored in a sea area away from the marina. Therefore, it is possible to clear up onshore and offshore congestion around marinas and harbors.

INDUSTRIAL APPLICABILITY

As described above, the self-propelled platform of the present invention can be easily and safely driven on land and on the sea by one person aboard the watercraft. Therefore, the self-propelled platform is freely movable on land, and is useful as a storage apparatus for a small watercraft. Moreover, since the self-propelled platform can be moored on the sea, it is also useful as a storage apparatus for a small watercraft inside and outside the marina.

When a small watercraft is used on the sea, it can be unloaded from or loaded on the self-propelled platform on the sea, and the self-propelled platform can stay on standby while floating on the sea. Therefore, the self-propelled platform is also suitably used as an apparatus for carrying small watercrafts inside and outside the harbor.

The invention claimed is:

1. A self-propelled platform comprising:
   a body portion (2) that removably receives a watercraft body;
   wheel portions (4a, 4b) provided at the front and rear of lower right and left sides of the body portion;
   power portions (5a, 5b) provided on upper right and left sides of the body portion to drive the wheel portions;
   power transmission portions (6a, 6b) for connecting the power portions and the front and rear wheel portions in a triangular form via cranks (6c, 6d);
   a control portion (11) for controlling the driving of the wheel portions; and
   floating body portions (7a, 7b) provided in the body portion.

2. The self-propelled platform according to claim 1, wherein the body portion (2) includes mooring means (17, 18).

3. The self-propelled platform according to claim 1, wherein the body portion (2) includes mooring means (17, 18) and buoys (19, 20).

4. The self-propelled platform according to claim 1, wherein the floating body portions (7a, 7b) are movable between the wheel portions (4a, 4b) and the power portions (5a, 5b).

5. A self-propelled platform comprising:
   a body portion (2) that removably receives a watercraft body;
   wheel portions (4a, 4b) provided on lower front and rear sides of the body portion;
   power portions (5a, 5b) provided above the wheel portions to drive the wheel portions;
   power transmission portions (6a, 6b) for connecting the power portions and the front and rear wheel portions in a triangular form via cranks (6c and 6d);
   a control portion (11) for controlling the driving of the wheel portions; and
   floating body portions (7a, 7b) provided in the body portion, above the wheel portions, and below the power portions.

6. The self-propelled platform according to claim 5, wherein the body portion (2) includes mooring means (17, 18).

7. The self-propelled platform according to claim 5, wherein the body portion (2) includes mooring means (17, 18) and buoys (19, 20).

8. The self-propelled platform according to claim 5, wherein the floating body portions (7a, 7b) are movable between the wheel portions (4a, 4b) and the power portions (5a, 5b).

* * * * *